Patented June 25, 1940

2,205,620

UNITED STATES PATENT OFFICE 2,205,620

METHOD OF STABILIZING FATS AND OILS AND RESULTING PRODUCT

Ernest C. Crocker, Belmont, Mass., assignor to Arthur D. Little, Incorporated, Cambridge, Mass., a corporation of Massachusetts No Drawing. Application July 19, 1939, Serial No. 285,281

18 Claims. (Cl. 99—163)

This invention relates to stabilization of animal and vegetable fats and oils, and more particularly to the inhibition or prevention of their natural tendency to become rancid.

While various treatments of fats and oils are known for the stabilization of the same against oxidation, they are in many instances not suitable for use with those fats or oils which are edible and intended for human consumption. This may be due to an inherent lack of suitability of the conditions or reagent used, or on account of harmful chemical activity and the like, or because of extraneous undesirable effects such as that of overcoming the natural flavor or odor of the fat or oil treated, or of imparting an undesirable flavor or odor thereto, on account of the treatment or reagent itself.

It is accordingly an object of this invention to provide a simple and safe method of stabilizing edible animal or vegetable fats and oils, to protect them from oxidation and rancidity, and at the same time to leave unimpaired their general fundamental suitabilities for food purposes and also their desirable characteristic flavors and odors. It is also an object to provide improved edible animal and vegetable fats and oils, both in respect of their natural qualities and in respect of their ability to preserve these properties through a prolonged period of time under the normal oxidizing conditions of the atmosphere. Other objects will appear from the following disclosure.

It is found that animal and vegetable fats and oils, which are naturally desirable for use in connection with or as a part of human food, but which in many cases are susceptible to oxidation by the air under atmospheric conditions and rapidly become rancid, may be protected from or stabilized against such changes by the addition thereto of certain edible resins. These may be dispersed through the fat or oil or dissolved therein and in this form are effective to accomplish the desired result. At the same time they are substantially completely insoluble in water and are characteristically without taste, non-volatile, and without odor.

Accordingly, the stabilized fat or oil possesses all of its desirable properties and at the same time is enabled to retain its natural properties for a prolonged period of time, without deterioration due to oxidation or rancidity. It follows, therefore, that fats and oils stabilized in this way may be prepared and then shipped for longer distances or stored in larger quantities and for longer periods of time than would otherwise be the case. Also, that when used they will be in better condition, more satisfactory and safer than would be possible if they were not thus stabilized and protected from oxidation and rancidification.

Typical of the edible fats which may be so treated is lard, which contains fatty acid compounds of unsaturated structure, and is susceptible to ready oxidation by atmospheric conditions, in consequence.

The various edible oils which may be treated by the process may resemble the fats in composition, in that they contain unsaturated fatty acids, or, as in the case of many of the vegetable oils, and especially the essential oils, they may be typified by containing terpenes or related compounds. Such compounds are susceptible of oxidation and/or polymerization whereby they may not only lose their desirable characteristic properties but may acquire undesirable properties such as an unpleasant taste or odor, resembling that of turpentine or varnish. These changes are well recognized in the art of preparing and using essential oils, for example, in which the taste and odor are most important qualifications. Upon aging, under atmospheric conditions and especially in contact with oxygen, the oils first lose their desirable flavors or odors and then acquire the taste and odor of varnish. This type of rancidity is called "terpiness" in the essential oils.

The stabilizing agent used in the present invention comprises the resinous compounds of licorice root, which are insoluble in water but soluble in ethyl alcohol. These compounds form a brownish resinous substance and will be referred to herein, collectively, as "licorice resin."

Licorice root, as heretofore treated for the extraction of its flavoring components, has been macerated and boiled with water or superheated steam, the resulting liquor being separated and concentrated for use. The spent root from this operation is generally either thrown away or utilized as a fibrous waste. More recently, such spent fibers have been extracted with sodium carbonate solution in some instances and the resulting soapy solution used in fire extinguishers of the foaming type to some extent, with carbon dioxide gas.

It is now found, however, that if the spent licorice roots or fibers, after the extraction with water, are extracted with a suitable solvent they yield a "licorice resin," as above referred to. For example, if they are treated with relatively concentrated ethyl alcohol (e. g., above 60%)

the licorice resin is dissolved as a whole. This I have found to consist of a mixture of various alcohol soluble resins, which have in common the property of being relatively insoluble in water.

To obtain the licorice resin for the purposes of this invention, the macerated fibrous root, preferably after preliminary extraction with hot water or steam, is extracted directly with a pure, concentrated ethyl alcohol. While not necessary, it is desirable to dry the fibrous matter and also to use anhydrous ethyl alcohol, if practicable. Aqueous ethyl alcohol, of concentrations down to 60%, may be effectively employed and other solvents, such as methyl alcohol, isopropyl alcohol, n-butyl alcohol, ethylene glycol mono-ethyl ether, etc., may be employed.

The total licorice resin as thus extracted may be obtained as such by evaporating the solvent, and may be used in the resulting purified condition, or in some instances it may be used while in solution. It is substantially completely insoluble in water and is without taste or odor, and hence does not impart any taste or odor to substances with which it is combined or mixed.

The licorice resin, as thus extracted, however, is not a single compound. I have found it to be made up of at least three distinguishable and quite different components.

These components may be distinguished, inter se, as falling into three groups: (1) soluble in alcohol and benzene but not soluble in petroleum ether, (2) soluble in alcohol but not soluble in benzene or petroleum ether, and (3) soluble in alcohol, benzene and petroleum ether, respectively.

Of these components of the alcohol-soluble licorice resin, the first is a waxy resin, with a comparatively sharp melting point of about 50° C.; the second is a resin that does not present a sharp melting point but softens with heat; and the third is an oil.

These may be separately recovered by treating the resin, which has been extracted by the procedure described above and then evaporated to dryness, first with petroleum ether, for example. The resulting solution may then be separated and will contain the petroleum ether soluble component (3) leaving components (1) and (2) unaffected. The residue, which is insoluble in and unaffected by petroleum ether, may then be extracted with benzene which will, of course, dissolve the benzene soluble component (1) and the resulting solution can be readily separated from the benzene-insoluble component (2) which is left as an undissolved residue.

On the other hand, if the alcohol-extracted "licorice resin" is dried and first treated with benzene, components (1) and (3) described above will be dissolved, leaving the benzene insoluble component (2) as a residue. Upon separating and evaporating the resulting benzene solution a soft solid, consisting of a mixture of components (1) and (3) will be left, and may be used as such or subsequently separated by extracting with petroleum ether, the soluble component (3) being thereby dissolved, and removed.

The benzene soluble component (1) upon evaporation of the solvent, is a firm, light-colored, waxy, resinous material of fairly definite melting point (about 50° C.) as described above, and is especially adaptable for the purposes of this invention. Its ready solubility in fats and oils promotes its effectiveness for treatment of such materials by effecting rapid dispersion and dissolution therein. It is accordingly very effective for use as an anti-oxidant with such substances.

The alcohol-soluble, benzene-insoluble component (2) is firm and shellac-like, and while not so soluble in fats as the benzene soluble component (1), is readily enough dispersed or dissolved in essential oils, and is an effective anti-oxidant therein.

The petroleum ether soluble component (3) which may be segregated from the alcohol-extracted licorice resin as above described or by a preliminary extraction of the spent licorice root with petroleum ether, is a liquid oil as already pointed out. It does not appear to be effective as an anti-oxidant to prevent oxidation and rancidification of either animal or vegetable fats or oils. On the contrary, it appears to have pro-oxidant properties, but it is usually present in such small proportions that its feeble pro-oxidant value may be neglected for it does not materially affect or reduce the anti-oxidant stabilizing action of the balance of the resin, from which it is therefore not even separated ordinarily, but allowed to remain with the other component or components, as the case may be. However, since it is fluid its removal leaves the remainder of the resin more solid, of more definite and higher softening point, and hence susceptible of different treatment in preparation and in dispersion in the fats or oils to be treated with it.

Another effective but not preferred procedure may be followed for the recovery of licorice resins from the roots, by treating the macerated and extracted licorice roots and fibers with an aqueous solution of sodium carbonate. The resulting extractive solution is then separated from the solids and neutralized with an acid such as sulphuric, whereupon the resin is precipitated and, upon washing with water and preferably after drying, is ready for use. Or, the precipitated resin may be obtained in purer condition by dissolving in alcohol, and further, if desired, by separating with benzene, alcohol, petroleum ether, etc., as above described.

It is possible to extract the constituents of licorice resin individually by direct treatment of the spent, water-extracted root with the selective solvent. Thus the spent root may first be extracted with benzene, to recover the benzene soluble component, and then with alcohol to recover the alcohol soluble component or with petroleum ether to recover the petroleum ether soluble component, followed by an extraction with alcohol.

For ordinary purposes of stabilizing fats or oils, the entire licorice resin as obtained by the alcohol extraction alone, for example, will be used. But in some cases the solubility relationships between the resin components and the oils or fats to be treated, or other considerations, may make it preferable to use only one of the two or three components above described. Again, the oil or fat may itself be used as the extractant for the spent root, as described below, in which event the relative proportion of the three principal components taken up by the oil or fat will depend upon such solubility relationships.

The amount of licorice resin to be used as a stabilizer in any given instance depends upon various factors such as the degree of stabilization desired, the condition and kind of the fat or oil to be treated, whether the licorice resin is used as such or in the form of one or more of its separated components, the degree of effectiveness of the particular stabilizer with the given fat or oil, and other conditions. As a rule, however, the amount required will be between 0.5% or less and 5% by weight of the substance to be stabilized.

As already indicated, the stablizer may be added to the fats or oils in various ways. Thus, the stabilizer may be added in its form as licorice resin, after extraction and evaporation of the solvent therefrom, in which instances the incorporation of the resin with the oil or fat is generally promoted by gentle heating. The stabilizer may also be added and dispersed in the form of the extract solution of the licorice resin, the solvent being left in the product or expelled by heating, as desired. In such cases, the solvent should, of course, be of agreeable odor and taste, as with ethyl alcohol. Again, the oil to be stabilized (or the fat if melted) can be filtered through a bed of the spent licorice root, of sufficient depth or for a sufficient length of time or number of times, to take up the desired amount of the fat soluble or oil soluble resin components directly from the spent licorice root.

The following examples will serve to illustrate typical practical applications of the present invention. For purposes of control, tests were made using an absorption apparatus adapted to shake or agitate the samples in the presence of oxygen. At least two samples were taken for test in each case, one for a blank and the other or others for treatment with the stabilizer. The time in hours which was required for a ten gram sample to absorb 50 cc. of oxygen at 75° C., or other suitable temperature, is referred to as the "life" of the sample, and furnishes a convenient approximation of the stability in actual use of the fat or oil. Practical taste and odor tests have confirmed the results and conclusions derived from the foregoing accelerated "life" tests.

*Example I*

A sample of lard was divided into three equal portions. Two of these portions were heated to 100° C. for 10 minutes, one as a control, the other in the presence of 4% by weight of dried spent licorice root. These two heated portions were then clarified and, with the blank, were severally tested for "life" as above described. The control suffered a loss of 40% in life, as compared with the blank, due to the heat treatment. The portion treated with the spent root had a life 145% longer than the control or approximately 45% longer than the blank.

*Example II*

A sample of lard was divided into three equal portions. One was used as a blank. To one of the others (portion A) was added the dried benzene extract of spent licorice root in an amount equal to 1% of the weight of the lard. To the third (portion B) was added the dried acid-insoluble fraction of the extract, obtained by treating spent licorice root with a 5% solution of sodium carbonate, followed by acidifying and drying, in an amount equal to 2% of the weight of the lard. The "life" values of portion A and portion B (determined at 100° C.) were found to be respectively 668% and 277% better than the similarly determined "life" of the blank.

*Example III*

Samples of essential oils were treated similarly, in equal portions, and the life of each determined in like manner, but using a temperature of 75° C. during the tests. For purposes of comparison the results with each oil are given when using the same amount (i. e., 1% on the weight of the oil) of the same stabilizer, namely the dried benzene extract of spent licorice root.

The results given under "blank" and "treated" in the following table are the life in hours of each sample, determined in the manner already described.

| Oil | Blank | Treated | Improvement (percent) |
|---|---|---|---|
| Lemon—California | 5.7 | 10.0 | 76 |
| Lemon—Italian | 4.2 | 9.5 | 122 |
| Lime | 0.65 | 1.9 | 192 |
| Peppermint | 5.0 | 10.0 | 100 |
| Cedarwood | 5.8 | 10.4 | 80 |

*Example IV*

A sample of peppermint oil was divided into two equal portions. One was used as a blank and to the other was added the ethyl-alcohol soluble fraction of the dried spent licorice root resin, in an amount equal to 2% on the weight of the portion. Both portions were tested in the oxygen-absorption apparatus as above described, at 75° C., and the treated portion showed an improvement in life of 688%.

As is well known, fats and oils, such as lard, and the essential oils, which are herein considered and included as examples of edible oils, frequently vary considerably in quality, due to source, conditions of formation, processing, storage, shipping, etc. Hence results between samples of a given kind of fat or oil will be expected to vary correspondingly. However, the foregoing examples are typical of a number of runs on other oils and fats of the same kinds and hence are representative.

The plasticity and resinous nature of the licorice resinor of one or more of its segregated components, as above described—also serve in various instances to confer other desirable properties upon various compounds in which it may be used in conjunction with the fats or oils and other substances.

It should be remembered that this disclosure is by way of illustration and exemplification of the present invention only, and that the invention is not limited thereto.

I claim:

1. Method of stabilizing edible fats and oils against oxidation or rancidity, comprising the step of treating the same with one or more of the solid components of licorice resin.

2. Method of stabilizing edible fats and oils against oxidation or rancidity, comprising the step of dispersing in the same one or more of the solid components of licorice resin.

3. Method of stabilizing edible fats and oils against oxidation or rancidity, comprising the step of dissolving in the same one or more of the solid components of licorice resin.

4. Method of stabilizing edible fats and oils against oxidation or rancidity, comprising the step of treating the same with the alcohol soluble, benzene insoluble component of licorice resin.

5. Method of stabilizing edible fats and oils against oxidation or rancidity, comprising the step of treating the same with the alcohol soluble, benzene soluble component of licorice resin.

6. Method of stabilizing edible fats and oils against oxidation or rancidity, comprising the step of treating the same with the petroleum ether insoluble components of licorice resin.

7. Method of stabilizing edible fats and oils against oxidation or rancidity, comprising the step of contacting macerated licorice roots therewith.

8. Method of stabilizing edible fats and oils against oxidation or rancidity, comprising the step of adding licorice resin thereto.

9. Method of stabilizing edible fats and oils against oxidation or rancidity, comprising the step of adding anti-oxidant component of licorice resin thereto.

10. Method of stabilizing edible fats and oils against oxidation or rancidity, comprising the step of adding anti-oxidant component of licorice resin thereto in an edible volatile solvent.

11. An edible fat or oil, stabilized against oxidation or rancidity and characterized by having therein an anti-oxidant component of licorice resin.

12. An edible fat or oil, stabilized against oxidation or rancidity and characterized by having therein licorice resin.

13. An edible fat or oil, stabilized against oxidation or rancidity and characterized by having therein one or more of the solid components of licorice resin.

14. An edible fat or oil, stabilized against oxidation or rancidity and characterized by having dispersed therein one or more of the solid components of licorice resin.

15. An edible fat or oil, stabilized against oxidation or rancidity and characterized by having dissolved therein one or more of the solid components of licorice resin.

16. An edible fat or oil, stabilized against oxidation or rancidity and characterized by having therein the alcohol soluble benzene insoluble component of licorice resin.

17. An edible fat or oil, stabilized against oxidation or rancidity and characterized by having therein the alcohol soluble benzene soluble component of licorice resin.

18. An edible fat or oil, stabilized against oxidation or rancidity, and characterized by having the petroleum ether insoluble components of licorice resin therein.

ERNEST C. CROCKER.